Patented Aug. 28, 1945

2,383,608

UNITED STATES PATENT OFFICE 2,383,608

ISOMERIZATION PROCESS

Charles S. Lynch, Plainfield, N. J., assignor to Standard Oil Development Company, a corporation of Delaware No Drawing. Application October 7, 1942, Serial No. 461,127

6 Claims. (Cl. 260—683.5)

The present invention relates to the isomerization of straight chain or normal paraffinic hydrocarbons to produce the corresponding iso or branched chain paraffinic hydrocarbons. More particularly, the invention is concerned with the isomerization of those hydrocarbons which have heretofore been considered as being readily decomposed when subjected to isomerization reactions. Particularly these feed stocks embody straight chain paraffins containing at least five carbon atoms per molecule, and the isomerization is carried out in the vapor phase using Friedel-Crafts type catalysts and halogen-containing promotors or substances which produce such promoters in situ.

In the isomerization of normal paraffins of at least five carbon atoms per molecule to their corresponding branched chain isomers various Friedel-Crafts type catalysts have been employed either with or without the addition of various promoters such as hydrogen chloride, hydrogen bromide, chlorine, bromine, carbon tetrachloride, chloroform, the lower alkyl halides such as methyl, ethyl, propyl and the butyl chlorides and bromides, and the like. Small amounts of water and substantial amounts of molecular or free hydrogen have likewise been employed and heretofore these reactions have been chiefly carried out in the liquid phase using sufficient superatmospheric pressures to maintain liquid phase operation. The present invention embodies the use of such catalysts and promoters but is concerned with a vapor phase type of operation. These operations are known to the art and are usually carried out using a bed type of reactor in which a porous carrier has sorbed thereon a suitable Friedel-Crafts type catalyst and the reactions are carried out under correlated temperature and pressure conditions so that the feed stock and promoter which are admixed and passed to the reactor isomerize and the desired isomers are recovered from the reacted mixture.

While such vapor phase operations have been found entirely practical for the isomerization of normal butane to isobutane, their application to processes involving the higher homologues of normal butane has been found quite difficult. Normal butane offers some considerable degree of resistance to cracking and degradation and hence does not decompose readily when subjected to temperatures of from 300° F. to 400° F., these temperatures being those commonly employed in vapor phase isomerization reactions. On the other hand, however, normal pentane is quite susceptible to cracking when subjected to such temperatures in the presence of Friedel-Crafts type catalysts such as aluminum chloride and the usual halogen-containing promoters and so it was heretofore thought necessary to carry out the vapor phase isomerization of normal pentane to isopentane at temperatures considerably below those mentioned for normal butane isomerization, namely, in the neighborhood of about 150° F. to about 225° F. Such a process, however, is not conducive to commercial yields of isopentane because of the fact that the rate of isomerization of normal pentane to isopentane is considerably slower at these lower temperatures than is the case when higher temperatures are employed, but heretofore when higher temperatures have been employed considerable amounts of normal pentane are decomposed to undesired products rather than being isomerized to isomers. Not only is it undesirable to have a substantial amount of degradation in the isomerization reaction from a standpoint of loss of efficiency based on the feed stock employed and the isoparaffin that it is desired to recover, but also it most always is found that in such degradations the catalyst becomes contaminated with tarry residues and quickly loses its catalytic activity so that the degradation of the feed stock has a corollary the degradation of the catalyst activity. Heretofore the introduction of substantial amounts of molecular hydrogen pressure has helped to some extent to minimize the excessive cracking and degradation of the normal paraffins containing five or more carbon atoms per molecule but this has not been the complete answer and does not eliminate the production of extremely low yields of isoparaffins. The amount of normal paraffin converted is oftentimes materially reduced by the introduction of large quantities of hydrogen and in this case it is readily apparent that the amount of isomerization is decreased in order to avoid the degradation.

It is an object of the present invention to materially increase the yields of desired isomeric branched chain paraffins containing at least five carbon atoms per molecule from their corresponding straight chain or normal paraffins while properly correlating the reaction conditions so that the rate of isomerization is substantially that employed in vapor phase isomerization of normal butane to isobutane and at the same time substantial degradation of the feed stock and resulting contamination of the catalyst is materially decreased and at times substantially completely avoided. It is a further object of the invention to not only secure increased yields of the desired isomers but also to improve the selectivity of the isomerization reaction. In effect, this means that for every mol of normal pentane undergoing isomerization more nearly one mol of isopentane is recovered therefrom; or, to define selectivity in another way, it is the number obtained by dividing the percentage of isopentane obtained in a given reaction by the percentage of normal butane undergoing reaction and multiplying the result by 100. In other words, if every mol of normal pentane were isomerized to one mol of isopentane the selectivity would be 100. It is a further object of the invention to increase the overall efficiency of isomerization reaction as measured in gallons of isoparaffin produced per pound of aluminum halide employed. Other objects will be apparent from a fuller understanding of the invention.

In carrying out the invention a salient feature of the same resided in the discovery that it is now possible to employ temperatures ranging between about 400° F. and about 500° F. in the isomerization of normal pentane to isopentane while at the same time avoiding excessive degradation or cracking of the feed stock and consequent contamination of the catalyst with tarry masses if the other reaction conditions are properly correlated when these heretofore considered detrimental high temperatures are used. It has been discovered that whereas temperatures of from 150° F. to 225° F. have heretofore been employed for the vapor phase isomerization of normal pentane to isopentane very low yields of the desired isopentane are secured and that although it was known that the rate of isomerization could be increased by increasing the temperature of the reaction it has now been discovered that not only is the rate of isomerization increased but the selectivity of the final product has been found to have been increased as well. Thus, for example, under comparable conditions in any given reaction in which 20% of normal pentane is reacted at a temperature of about 325° F. only about 45% of that amount of normal pentane was found to have been converted to isopentane, whereas under the same conditions except when employing a temperature of 400° F. and wherein 20% of the normal pentane reacted, 60% of this same amount of normal pentane was found to have been converted to isopentane. Under still more drastic reaction conditions wherein 40% of the normal pentane feed was reacted at a temperature of 325° F., about 27.5% of that 40% reacted was found to be isopentane, whereas at 400° F. about 47% of the 40% reacted was found to have been converted to isopentane. In other words, where only small amounts of normal pentane are reacted the selectivity variation between the two temperatures of 325° F. and 400° F. represents a spread of selectivity of only about 16 or 17, yet at a point where 40% of the normal pentane is reacted the spread in selectivity is even greater as between 325° F. and 400° F. and represents a differential of about 20 in the selectivity. Even when operating at temperatures as high as 500° F. the selectivity and conversion are improved over that obtained at 325° F. or at temperatures of from 150° F. to 225° F. such as have heretofore been customarily employed.

In order to accomplish these results, however, it is necessary that the reaction conditions, catalyst activity, etc., be carefully correlated with respect to one another so that the marked increase in temperature does not result in an increased degradation of the feed stock and resulting contamination and tarring of the catalyst. The catalyst is usually aluminum chloride or aluminum bromide impregnated or sorbed on a suitable carrier, preferably a porous carrier such as, for example, activated carbon, activated alumina, diatomaceous earth, acid-treated clays such as bentonite, kaolin, montmorillonite, Super Filtrol, bauxite, fuller's earth, the permutites, Tonsil, Celite, Sil-O-Cel, partially, substantially or completely dehydrated, calcined bauxites such as Porocel, alumina gel, silica gel, and the like. A preferred type of carrier is Porocel, which is a partially dehydrated, calcined bauxite, although any highly porous material capable of absorbing and holding tenaciously a suitable amount of aluminum halide may be used. The aluminum halide, for example aluminum chloride, is impregnated on and sorbed in the carrier to the extent of between about 4% and about 12% although amounts of aluminum chloride outside of these ranges may be employed if desired. A number of methods may be employed for impregnating or sorbing the aluminum chloride in the porous carrier, for example Porocel. This may be done by vaporizing aluminum chloride and passing the vapors in the presence of a carrier gas such as nitrogen, carbon dioxide, chlorine, bromine, hydrogen chloride, hydrogen bromide, hydrogen, or the like, into contact with the Porocel which has previously been heated to a temperature of from 1000 to 1400° F. for from 1 to 18 hours before thoroughly drying the same, or the Porocel may have lumps of aluminum chloride admixed with it and the same heated to disperse the vapors of aluminum chloride through the Porocel mass. Still a second alternative resides in the use of a suitable solvent for the aluminum chloride such as ethyl chloride, ethylene dichloride, dioxane, and the like, so that a solution of aluminum chloride in the solvent is contacted with the Porocel and after a suitable length of time the mass is drained of excess liquid and heated to drive off the solvent contained therein, leaving behind in the pores of the carrier the aluminum chloride.

The invention is not restricted to any particular method of catalyst formation so long as the solid bed type of catalyst mass is employed. Although not a particularly advantageous way to carry out the invention, it is within the contemplation of the present process to employ a solid catalyst mass composed entirely of lumps or granules or pellets of solid aluminum chloride. Such a process, however, is not feasible because of the consequent plugging of lines, valves, towers and the like with condenser vapors of aluminum chloride. In preparing the aluminum chloride on porous carriers it is ofttimes desirable to subject the resultant aluminum chloride-Porocel mass to temperatures of from 25 to 100° higher than that to be encountered in the isomerization reaction and to pass inert carrier gases therethrough in order to remove any loosely held aluminum chloride so that the catalyst actually employed is a carrier containing only tenaciously held aluminum chloride and no large amount of vapors of aluminum chloride are then given off during the carrying out of the isomerization reaction.

The feed stock employed in conjunction with the present process may be quite varied. Normal pentane, normal hexane, normal heptane and the higher straight chain homologues may be employed or mixtures of two or more of these may be employed. Also, casing-head gasoline and other straight run naphthas obtained either from natural gas or from petroleum distillates may likewise be employed. The process is chiefly concerned with the conversion of normal pentane to isopentane but a modification of reaction conditions is possible to convert normal hexane to isohexanes, and so forth. It is not necessary that the feed stock be 100% normal pentane but it may contain small amounts of isopentane and still be suitable for the process.

In order to preserve the life of the aluminum chloride catalyst mass it has been found desirable to pretreat feed stocks employed in order to remove therefrom excessive amounts of water and to also remove olefins, sulfur compounds and the like which are frequently in association with the feed stocks. The olefin and water are removed first by treating with concentrated sulfuric acid of the order of 90 to 98% or by the use of suitable strengths of fluosulphonic or chlor-sulphonic acid. Caustic solutions may be employed for the removal of sulfur compounds.

The isomerization is usually carried out in the presence of any one or more of the promoters heretofore mentioned and they may be employed in amounts ranging between about 2% and about 22%, preferably in amounts ranging between about 4% and about 8% by weight based on the normal paraffins charged. The higher amounts of promoter are usually employed where elemental or free hydrogen is employed and this is generally used in amounts ranging between about 50 and about 600 lbs./sq. in. of partial pressure of free or molecular hydrogen, preferably in amounts ranging between about 100 and about 250 lbs./sq. in. partial pressure.

The time of contact employed in the reaction varies considerably depending upon the specific temperature employed and it is quite important that the feed rate be substantially constant for any given run in order to control accurately the conversion so as to avoid excessive degradation. In general, where the temperature of the reaction is maintained between about 325° F. and 550° F. the throughput varies between about 0.25 and about 2 volumes of liquid normal paraffin per volume of catalyst mass per hour, or, in other words, the time of contact may range as much as from 16 to 260 seconds, preferably between about 25 and about 175 seconds, when a preferred temperature of between about 400° F. and about 500° F. is employed.

The proper superatmospheric pressure to be employed is usually determined by the efficiency of separation of the hydrogen halide or other suitable gaseous promoters in the stripping tower from the reacted mixture, although the pressure in the stripper is not necessarily the same as that maintained in the reactor. In general, the reaction is maintained under sufficient superatmospheric pressure to maintain an easy stripping operation and at the same time if molecular or free hydrogen is employed then still higher pressures up to as high as 1000 lbs./sq. in. total pressure may be used.

No special type of apparatus or construction is necessary in carrying out the process of the present invention. It may be carried out on either a batch scale or continuous type of operation, although its highest utility is to be found in the commercial continuous type of operation. The reactors are generally of the type employed for solid catalyst operation wherein perforated plates or baskets are employed for the retention of catalyst masses therein and through which the vapors are allowed to pass. The reactor may be jacketed or coils may be placed inside the reactor proper as accurate temperature control means. The reactor may be a single one or a plurality of reactors arranged in either series or parallel and the feed stock may be continuously fed to one of these reactors even though the others may be off stream for the removal or for the regeneration of spent catalyst. In the regeneration of the catalyst the mass is usually heated to drive off any aluminum chloride vapor that can be driven off and the carbonaceous residues are then subjected to a burning operation at temperatures of 700–1000° F. coupled with the passage of free oxygen or free-oxygen-containing gases diluted with carbon dioxide, hydrogen or some inert material, therethrough to remove and burn the carbon therefrom. Once the pores of the carries are free, aluminum halide vapors may be introduced into the carrier and the same reimpregnated in conventional manner.

The following examples are given in order to afford a clearer understanding of the character of the invention, although it is to be distinctly understood that the invention is not limited thereto.

*Example 1*

An isomerization catalyst was prepared by charging to a closed tubular reactor about 30 grams of anhydrous aluminum chloride and sufficient Porocel which had previously been heated to a temperature of about 1100° F. for about 15 hours to form a final composition of about 8.8% aluminum chloride on the Porocel. The mixture was placed in the continuous reactor and sealed in. A mixture of normal pentane containing between 5 and 6 weight per cent of hydrogen chloride was then passed through this reactor which was maintained at about 400° F. under a pressure of about 85 lbs./sq. in. The rate of addition of the normal pentane was at between about 0.49 and about 1 liquid volume of normal pentane per volume of catalyst per hour. This corresponded to a contact time of between about 33 and about 64 seconds. This operation was continued for a total of 12 hours and at approximately hourly periods a sample of the reacted mixture was withdrawn and analyzed for isopentane production and it was found that the isopentane varied between 10% and 16% of the final product and that the selectivity of the reaction varied between about 41 and 75 with an average yield of isopentane of 13% and an average selectivity of 61%. The yield of gallons of isopentane per pound of aluminum chloride was about 1.8.

Contrasted with this operation, a run was carried out using the same catalyst mass with a v./v./hr. of between about 0.49 and about 0.53, at a temperature of about 325° F. and under 180 lbs./sq. in. total pressure, using the same feed stock. It was found that the highest yield of isopentane was only 15%, with the lowest being 1%, and that the selectivity varied between 37 and 88 with the average selectivity being 48% and the average yield of isopentane 6%. The yield of isopentane amounted to 0.9 gallon per pound of aluminum chloride.

In another run wherein the temperature was 125° F. and the throughput about 0.3 v./v./hr., the product analysis showed at the most 1% yield of isopentane in 2 hours of operation but the degradation was quite excessive since the product contained 12% of C₄ and lighter hydrocarbons. In still another operation using a temperature of 200° F. and a gauge pressure of 25 lbs./sq. in. with a throughput of 0.5 v./v./hr., less than 3% of isopentane was obtained in the period of 6 to 8 hours of running and only 8% of isopentane was obtained in the first 2 hours of operation. The selectivity in this first 2-hour period was roughly about 30.

Example 2

Another run was carried out at 400° F. in a manner similar to that described in the first example and run for a total of 24 hours under pressures varying between 35 and 180 lbs./sq. in. and the feed rates ranging between about 0.25 and 1 v./v./hr. The yield of isopentane averaged 16% and the selectivity averaged 54. The overall yield of isopentane in gallons per pound of aluminum chloride was 1.5.

Example 3

Another run was carried out at a temperature of 500° F. under pressures ranging from atmospheric up to 180 lbs./sq. in. over a period of 17 hours with the throughput varying between 0.49 and 1.08 v./v./hr. The yield of isopentane averaged about 10% and the selectivity about 56 with a yield of about 1.8 gallons of isopentane per pound of aluminum chloride.

Having thus described and illustrated the character of the invention, what is desired to be secured by Letters Patent is:

1. The process which comprises isomerizing normal pentane in the vapor phase under isomerization reaction conditions in the presence of promotional amounts of halogen-containing promoter and in the presence of aluminum chloride, the temperature of the reaction being maintained at between about 400° F. and about 500° F. and the throughput between about 0.25 and about 1 volume of liquid normal pentane per volume of catalyst per hour while correlating the reaction conditions to secure the corresponding branched chain paraffins as the predominant product of the reaction.

2. A process of increasing the yield of isopentane per mol of normal pentane reacted in the vapor phase isomerization of normal pentane in the presence of aluminum chloride and a hydrogen halide promoter under superatmospheric temperatures and pressures, which comprises maintaining the temperature of the isomerization reaction between about 400° F. and about 500° F. and the throughput between about 0.25 and about 1 volume of liquid normal pentane per volume of catalyst per hour while correlating the time of contact and other reaction conditions to secure isopentane as the predominant product of the reaction.

3. A process as in claim 2 wherein between about 50 and about 600 lbs./sq. in. molecular hydrogen partial pressure is maintained.

4. A process which comprises isomerizing normal pentane at a temperature of about 400° F. at a throughput of between about 0.25 and about 1 volume of liquid normal pentane per volume of catalyst per hour under a pressure of between about 2 and about 12 atmospheres while permitting the normal pentane vapors to flow through a catalyst bed of aluminum chloride sorbed in a partially dehydrated, calcined bauxite, said vapors having admixed therewith between about 4 and about 8 weight per cent of hydrogen chloride, and recovering isopentane from the reacted mixture.

5. A process as in claim 4 wherein the catalyst mass contains between about 8 and about 12% of aluminum chloride and wherein between about 0.005 and about 0.04 weight per cent of aluminum chloride vapor is added to the reaction zone by admixture with the normal pentane feed in order to maintain catalytic activity of the isomerization catalyst mass.

6. A process for the isomerization of normal pentane which comprises contacting vapors of normal pentane containing between about 4 and about 8 weight per cent of hydrogen chloride at a space velocity of between about 0.49 and about 1 volume of liquid normal pentane per volume of catalyst per hour at a temperature between about 400° F. and about 500° F. in contact with aluminum chloride present in a porous carrier in the amount of between about 4 and about 12% by weight, and recovering isopentane from the reacted mixture.

CHARLES S. LYNCH.